J. GREEN.
Melting and Smelting Furnace.
No. 3,178.
Reissued Nov. 3, 1868.
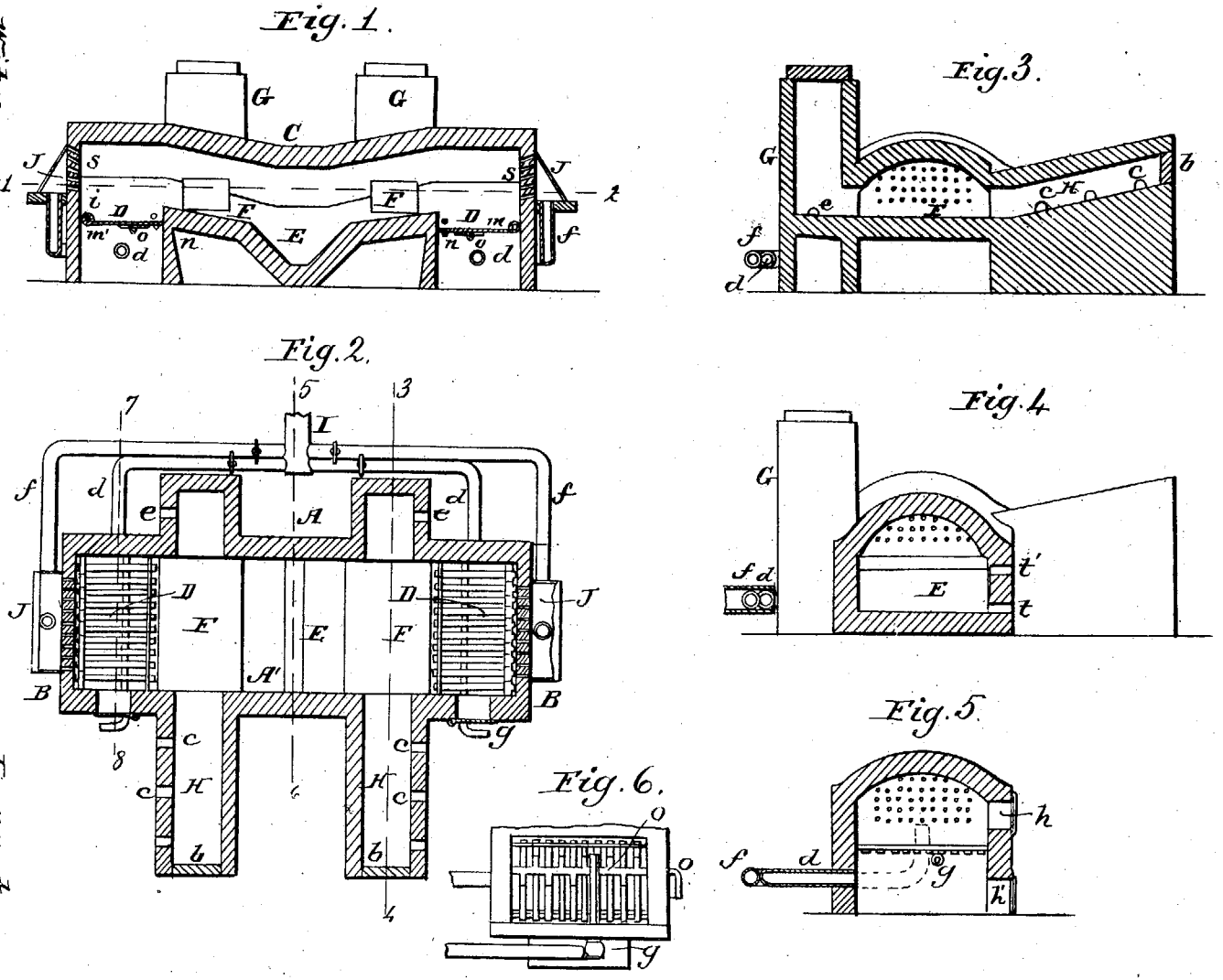
Witnesses:
Wm. Ashbolton
Wm. Albert Lane
Inventor:
Jacob Green
By his Atty
N. Hawes
N. PETERS. Photo-Lithographer, Washington, D. C.

UNITED STATES PATENT OFFICE.

JACOB GREEN, OF NORRISTOWN, AND THOMAS H. WILLSON, HIRAM WILLSON, AND CHARLES R. ADAMS, OF PHILADELPHIA, PENNSYLVANIA, AND SAMUEL MUNN, OF HACKENSACK, N. J., ASSIGNEES OF JACOB GREEN.

IMPROVEMENT IN FURNACES FOR TREATING IRON, AND FOR OTHER PURPOSES.

Specification forming part of Letters Patent No. 63,240, dated March 26, 1867; Reissue No. 3,178, dated November 3, 1868.

DIVISION B.

*To all whom it may concern:*

Be it known that we, J. GREEN, of Norristown, Montgomery county, Pennsylvania, and T. H. WILLSON, H. WILLSON, and C. R. ADAMS, of Philadelphia, Pennsylvania, and S. MUNN, of Hackensack, Bergen county, New Jersey, are the owners of certain Letters Patent granted, on the 26th day of March, 1867, to the said J. GREEN, for an Improvement in Furnaces, &c.; and we do hereby declare the following to be a full, clear, and exact description of the same.

The invention consists of a furnace constructed and combined with certain blast and steam pipes, in the manner fully described hereinafter, for the melting of metals, the reduction of ores, &c.

In order to enable others skilled in the art to make and use the said invention, we will now proceed to describe its construction and operation, reference being had to the accompanying drawing, which forms a part of this specification, and in which—

Figure 1 is a sectional elevation of the improved furnace; Fig. 2, a sectional plan on the line 1 2, Fig. 1; Fig. 3, a sectional elevation on the line 3 4, Fig. 2; Fig. 4, a sectional elevation on the line 5 6, Fig. 2; Fig. 5, a sectional elevation on the line 7 8, Fig. 2; and Fig. 6, an inverted plan view of part of the furnace.

A A′ are the side walls, B B′ the end walls, and C is the top, of the furnace, at each end of which is a fire-place, D. The top C of the furnace is arched transversely and depressed in the middle, as shown in Fig. 1, and midway between the two fire-places is a basin or "bosh," E, at each side of which is an inclined bed, F. At the side of the wall A are two chimneys or stacks, G G, each of which communicates with the furnace, one at the side of one bed and the other at the side of the other bed, F, the bottom of each stack being inclined toward the bed, as shown in Fig. 3. At the opposite side of the furnace are two inclined chambers, H H, each of which is closed at the outer end by a slab, *b*. In one of the side walls of each chamber H are openings *c c*, and near the lower end of each stack G is an opening, *e*, for a purpose described hereinafter.

To a rod, *i*, extending across each fire-place D, are connected a number of grate-bars, *m*, which rest at their outer ends on a rod, *n*, and beneath the bars is a shaft, *o*, arms on which bear against the under sides of the bars, so as to alternately raise and lower the same on vibrating the shaft. In the wall A′, opposite each fire-place, are openings *h h′*, which are furnished with suitable doors, and in the wall, opposite the basin E, are openings *t t′*, Fig. 4.

From a blast-pipe, I, extend four branches, *d d f f*, each of the pipes *d* passing through the wall A into the ash-pit of one of the fire-places, and through each end wall B B, below the fire-grate, passes a steam-pipe, *g*. Each of the branch pipes *f* extends to an air-chamber, J, which communicates, through openings *s s*, with the furnace, the said openings being so inclined that jets of air passing through the same shall be directed onto the adjacent bed F. Each of the pipes *f d g* is provided with suitable stop-cocks for regulating the admission of air or steam to the furnace.

When a metal is to be extracted from masses of ore, the furnace is first thoroughly heated, the fire-place doors are closed, the ore and limestone are thrown into the stacks G G, stoppers are placed in the openings *c e*, and slabs over the tops of the stacks, the stoppers and slabs being so formed as not to completely close the openings to which they are fitted. Air and steam are now admitted, through the pipes *d*, *f*, and *g*, into the furnace, and, as the only outlets for the gases are at the sides of the stoppers of the openings *c e* and of the slabs at the top of the chimney, the heated gases will pass from the furnace into the stacks, and, among their contents, to the said openings. After the material in the stacks has been sufficiently heated or roasted, a portion of the same is moved onto the beds F, where it is subjected to the action of the blast from the openings *s s*, by which the heat is so concentrated on the mass of ore as to quickly effect its reduction, the metal flowing down the inclined beds into the basin E, from which it is removed through the tapping-hole *t*, the slag being withdrawn through the opening *t'*.

Additional quantities of ore are from time to time thrown onto the inclined beds F, while the stacks are replenished at suitable intervals. The exit-openings are of such a size that the waste gases can pass but slowly from the furnace. There is, therefore, such a slight draft or current that no particles of metal can be carried to the stacks, and such a circulation of the gases is produced without discharging the same from the furnace as will cause their intimate admixture and their thorough combustion or their combination with the materials for which they have an affinity.

Inasmuch as the blast or heat is concentrated on the ore, the dispersion of the heat, the undue heating of parts of the furnace not required to be maintained at a high temperature, and the waste of fuel, are prevented.

The blasts and jets of steam are so regulated that a pressure is maintained within the furnace, and the external air is thus prevented from obtaining access to the interior, except through the blast-pipes, and the contact of free oxygen with the ore, and the formation of an oxide of the metal, are prevented, the air and steam from the blast-pipes mingling so thoroughly with the heated gases before coming in contact with the ore that their oxygen, being combined with carbon, is destroyed. The gases derived from the steam and air also enter in combination with the sulphur given off from the coal, and form sulphurous acid, the sulphur being thus prevented from entering into injurious combination with the metal.

When charcoal or other material is combined with the ore before smelting, the latter and the pulverized material are introduced into the inclined passages H H, stoppers are so fitted to the openings *c c* as to permit a slight escape of gas around the same, and the material is thrown onto the beds F F and smelted, as before described.

By the arrangement of two fire-places, beds, and a reservoir, above described, a most efficient, compact, and economical furnace is produced. A furnace having but one fire-place may, however, be used; and, where but one character of ore is to be treated, either the stacks G or the passages H may be dispensed with.

Without confining ourselves to the precise construction and arrangement of parts herein described, we claim as the invention of the said JACOB GREEN, and desire to secure by Letters Patent—

1. The combination, in a smelting-furnace, of pipes through which a mixture of steam and air can be introduced below the fire, and currents of air among the products of combustion, previous to the latter being brought into contact with the ore, for the purpose specified.

2. A chamber or chambers, H, through which the ore is admitted to the furnace, when the said chambers are arranged in respect to the bed and to the fire-place, substantially as specified.

3. The fire-place D, bed F, stack G, inclined passage H, with its openings *c c*, and reservoir E, all constructed and arranged substantially as and for the purpose set forth.

4. The combination of the two fire-places D D, stacks G G, passages H H, beds F F, and the basin E, the whole being constructed and arranged substantially as specified.

In testimony whereof we have signed our names to this specification before the subscribing witnesses.

JACOB GREEN.
THOMAS H. WILLSON.
HIRAM WILLSON.
CHARLES R. ADAMS.
SAMUEL MUNN.

Witnesses:
JOHN WHITE,
H. HOWSON,
EDWIN F. CORRY, Jr.,
WM. A. STEEL.